United States Patent [19]

Gilliland

[11] 4,056,289
[45] Nov. 1, 1977

[54] OCCUPANT PROPELLED TREAD VEHICLE

[76] Inventor: George E. Gilliland, 6001 Topke, Albuquerque, N. Mex. 87101

[21] Appl. No.: 622,040

[22] Filed: Oct. 14, 1975

[51] Int. Cl.² .............................................. B62D 55/22
[52] U.S. Cl. ..................................... 305/47; 272/115; 305/17; 305/44; 305/58 R
[58] Field of Search .................................... 305/15–17, 305/44, 47, 58 PC, 58 R, 35 R, 60; 280/205–208, 78; 272/1 R, 115; 180/9, 10

[56] References Cited

U.S. PATENT DOCUMENTS

| 741,938 | 10/1903 | Sell | 305/17 |
|---|---|---|---|
| 2,399,874 | 5/1946 | Livingston | 280/206 |
| 2,564,377 | 8/1951 | Sigurjonsson | 305/47 X |
| 2,756,830 | 7/1956 | Hurthig | 180/10 X |
| 3,104,113 | 9/1963 | Montz | 305/47 X |
| 3,575,443 | 4/1971 | Aguilar | 280/206 |

OTHER PUBLICATIONS

Creative Playthings Catalog, 1969–1970, p. 71, "Lunar-track".

Primary Examiner—Robert B. Reeves
Assistant Examiner—John P. Shannon
Attorney, Agent, or Firm—Mason, Fenwick & Lawrence

[57] ABSTRACT

An amusement device comprising a closed loop formed of a plurality of hingedly connected slats connected at facing edges to permit a user to walk along the top of the loop which moves in an opposite direction or to move the vehicle from inside the loop; another aspect resides in a user supporting roller-sled supported to roll over the lower surface of the interior of the loop to permit riding movement of the device down inclined surfaces while another embodiment employs a composite loop consisting of two relatively movable loops joined by a continuous slide bearing with either loop being movable to provide a steering effect.

16 Claims, 11 Drawing Figures

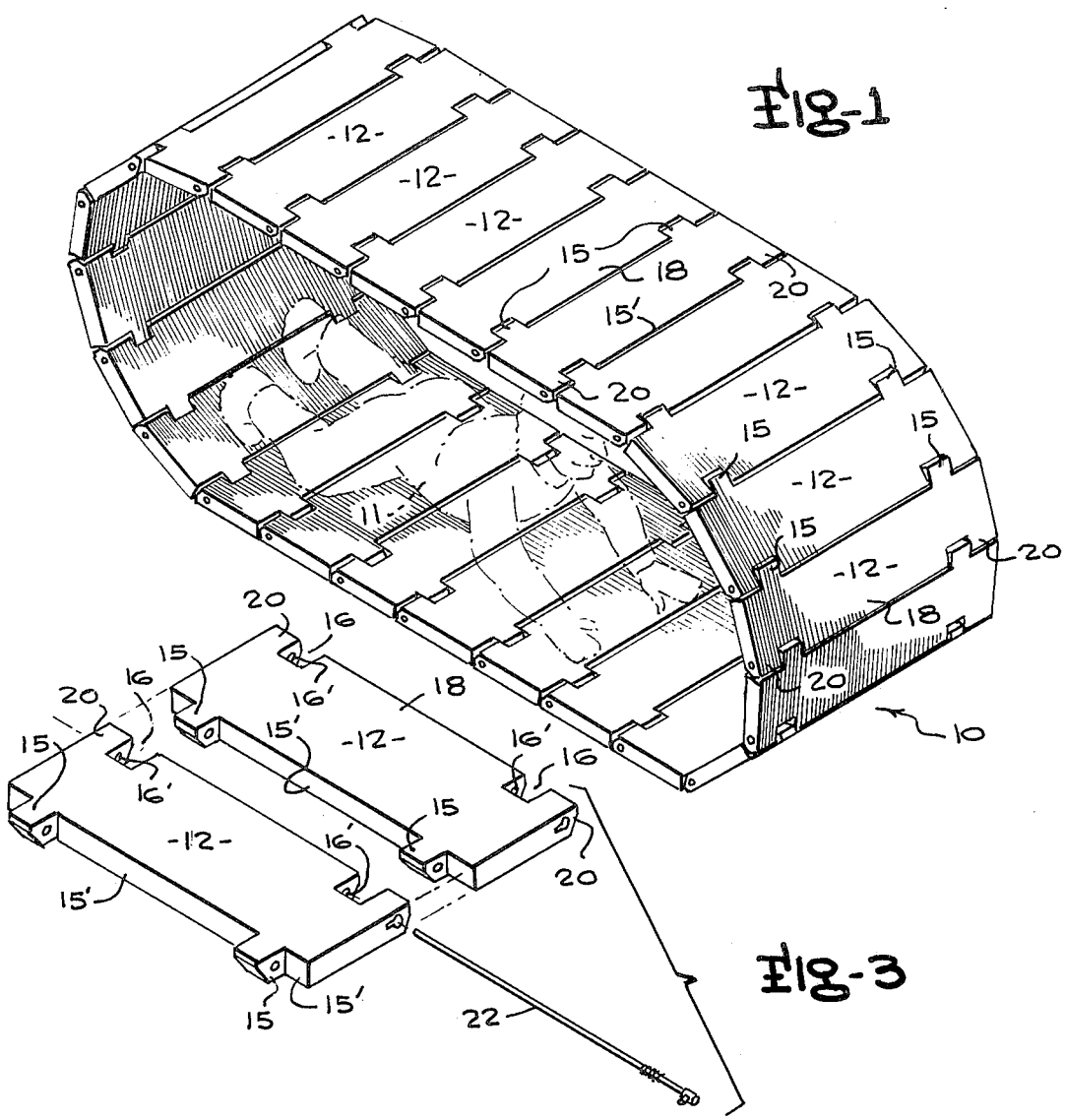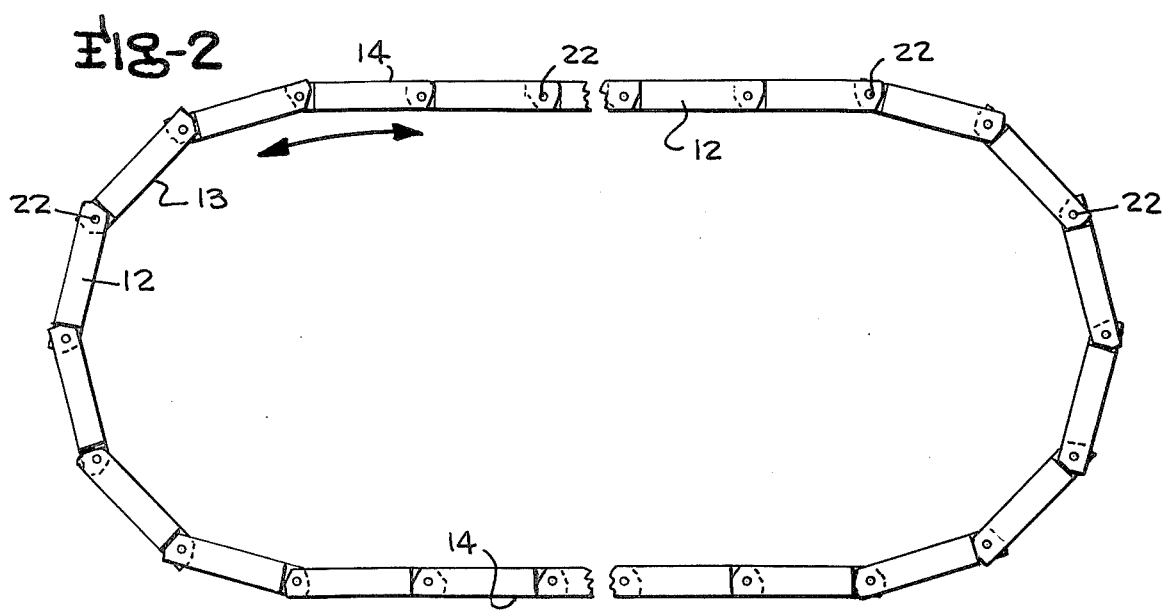

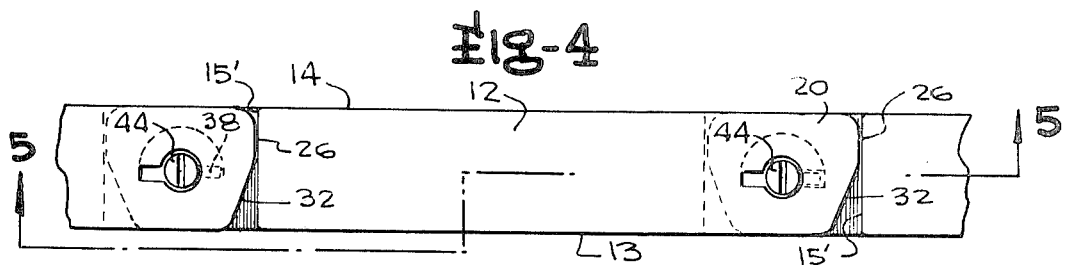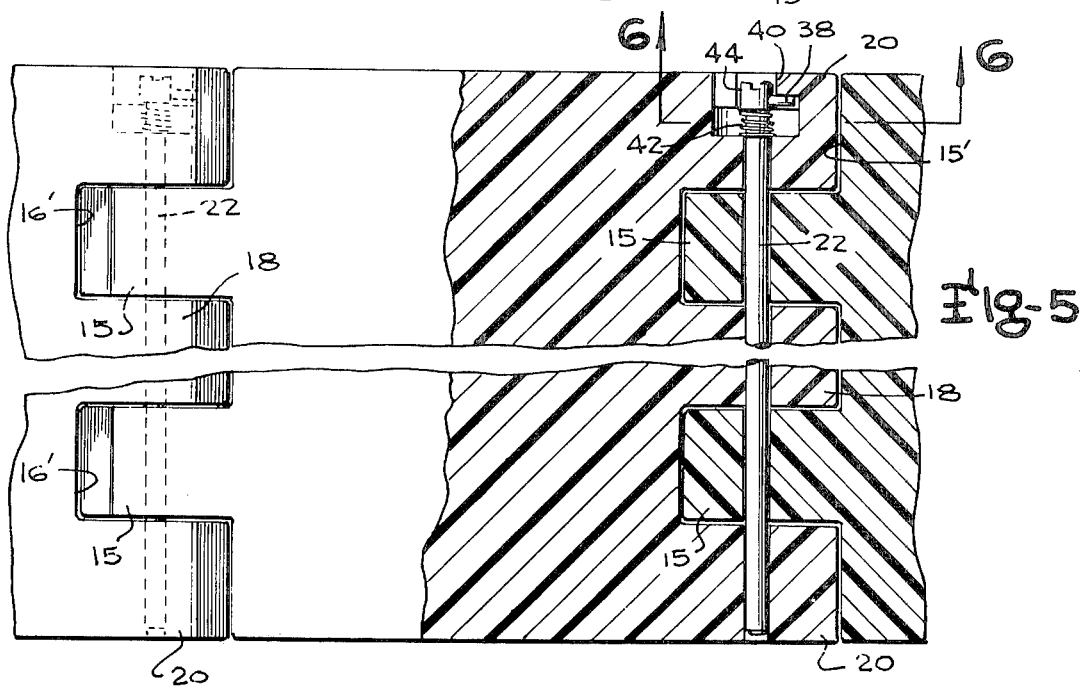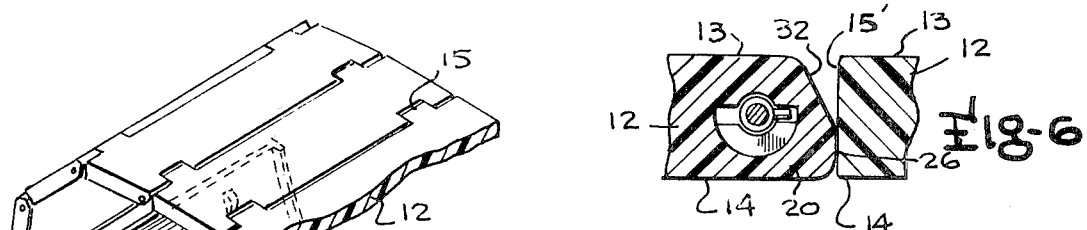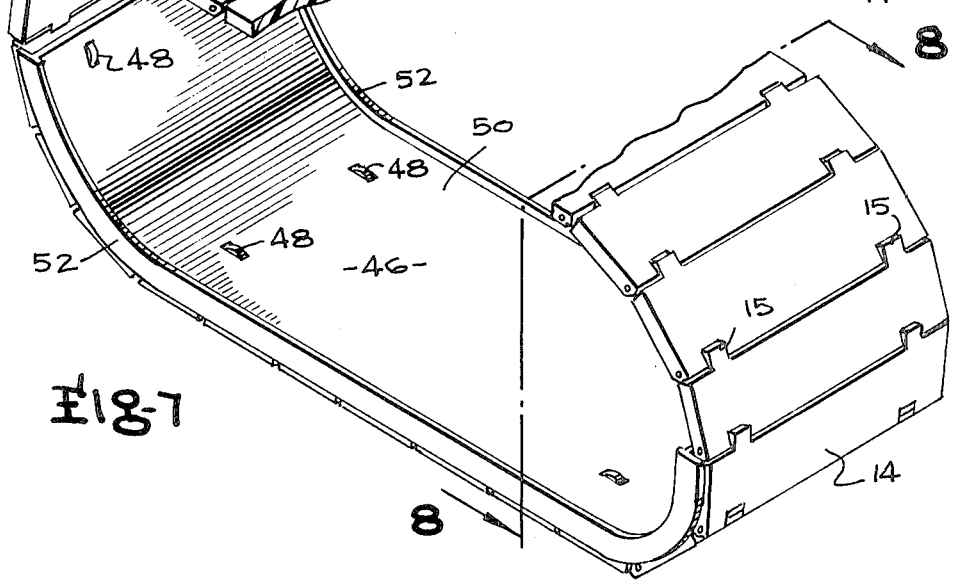

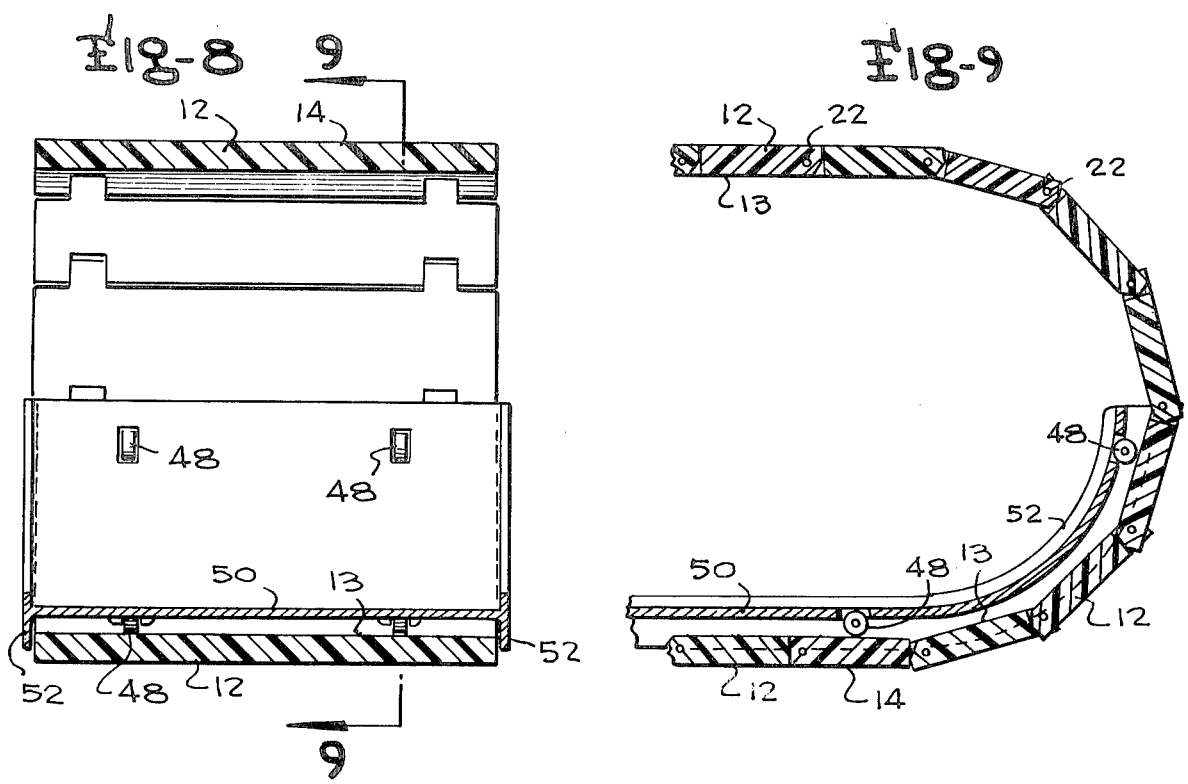
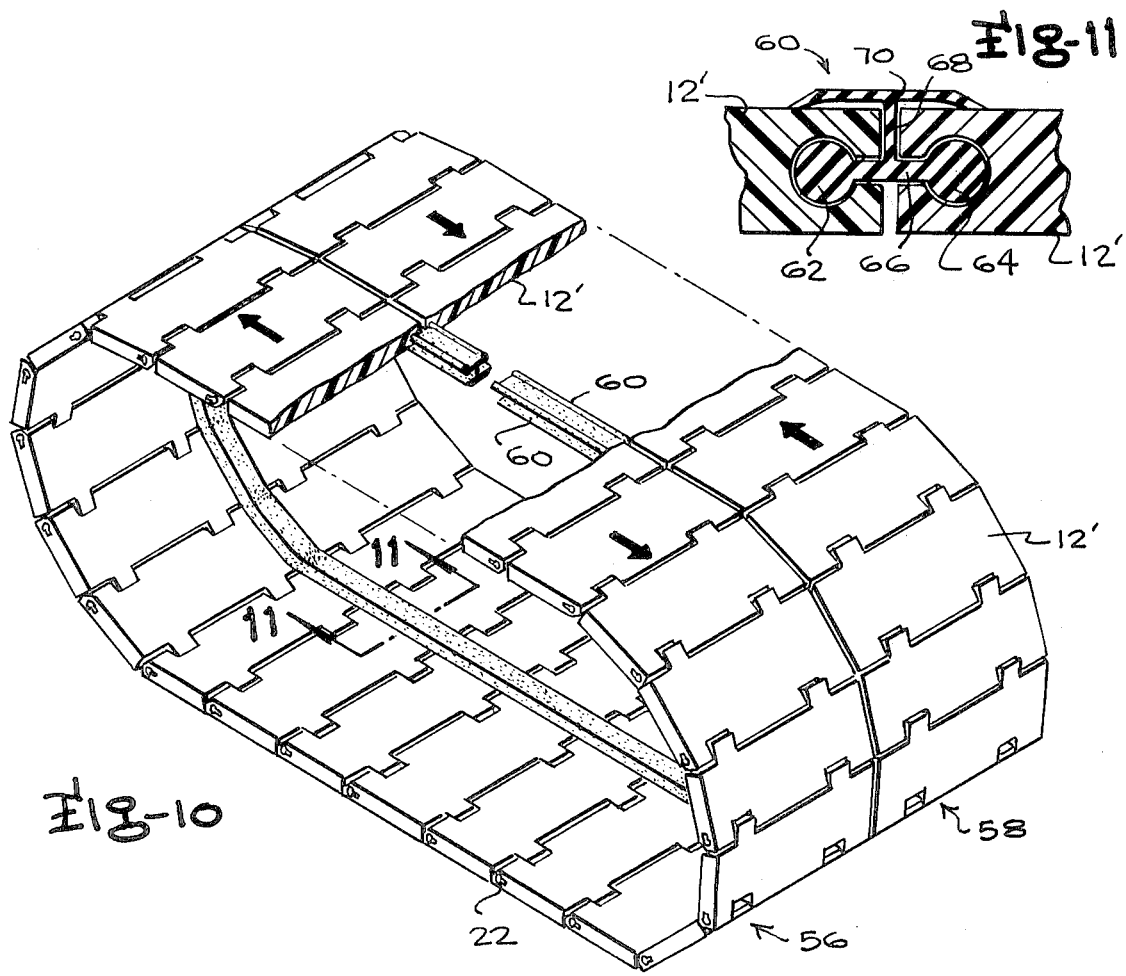

OCCUPANT PROPELLED TREAD VEHICLE

This invention is in the field of amusement devices and is specifically directed to the field of vehicle type amusement devices. U.S. Pat. No. 2,667,349 discloses a track type amusement device formed of a flexible strip joined at the ends by an adhesive tape or the like. The device of the patent does not enable any provision for adjustment of the size of the track member. Additionally, the device of the patent cannot be steered and is of limited versatility in manner of use.

Therefore, it is the primary object of the subject invention to provide a new and improved amusement device.

Yet another object of the invention is the provision of new and improved amusement devices consisting of a track-type vehicle.

Achievement of the objects of the invention is enabled by the provision of a plurality of slat members connected together adjacent facing edge portions by hinge means to form a closed track type loop. The hinge members include abutment portions which prevent the relative pivotal movement of adjacent slat members outwardly with respect to the loop so that the loop provides a relatively rigid support surface on which a user can stand so as to walk in one direction and create movement of the loop in an opposite direction. Alternatively, the user can move the loop from within the interior of the loop by crawling in one direction which causes the loop to move in the same direction.

The slats are hingedly connected by removable pivot pins which can be removed to permit replacement or addition of slats or the removal of slats for repair purposes or for adjusting the size of the loop. An additional feature of the invention resides in the provision of a roller-sled having rollers on the interior of the loop and having guide flanges for maintaining the roller-sled on the interior of the loop so that a user can ride on the roller-sled as the loop is traversed down an inclined supporting surface such as a hill or the like.

Another embodiment of the invention employs two component loops joined by a plastic slide bearing engageable in slots in the ends of the slats forming the component loop so that each loop can be operated at a different speed or in a different direction to enable a steering of the composite loop.

A better understanding of the manner in which the objects of the invention are achieved will be enabled when the following written description of the preferred embodiment is considered in conjunction with the appended drawings in which:

FIG. 1 is a perspective view illustrating the preferred embodiment of the invention as employed by a child or other user;

FIG. 2 is a side elevation view of the embodiment of FIG. 1;

FIG. 3 is an exploded perspective view of two slat components and pivot connection means thereof used in the preferred embodiment;

FIG. 4 is an enlarged side elevation view of a portion of the preferred embodiment;

FIG. 5 is a sectional view taken along lines 5—5 of FIG. 4;

FIG. 6 is a sectional view taken along lines 6—6 of FIG. 5;

FIG. 7 is a partial perspective view of the preferred embodiment illustrating an optional roller-sled member usable with the embodiment of FIGS. 1-6;

FIG. 8 is a sectional view taken along lines 8—8 of FIG. 7;

FIG. 9 is a sectional view taken along lines 9—9 of FIG. 8;

FIG. 10 is a perspective view of a second embodiment of the invention; and

FIG. 11 is a sectional view taken along lines 11—11 of FIG. 10.

Attention is initially invited to FIG. 1 of the drawings which illustrates the preferred embodiment of the invention, generally designated, as it is employed by a user such as a child 11 illustrated in dotted lines in the form of a child. It will be observed that the preferred embodiment of the invention consists of a closed loop 10 formed of a plurality of planar slat members 12 joined together by hinge means adjacent their facing edge surfaces. The inner surface of loop 10 is formed of the inner faces 13 of slats 12 while the outer surface of the loop is provided by the outer faces 14 of the slats.

Each slat 12 includes a pair of male pivot lugs 15 extending outwardly from one edge surface 15' of the slat and a pair of slots 16 extending inwardly from an opposite edge to a flat surface termination 16' as best illustrated in FIG. 3. The opposite edge of each slat is consequently divided by slots 16 into a medial pivot lug portion 18 and end pivot lug portions 20.

The male pivot lugs 15 extend into the slots 16 and a pivot pin 22 extends through aligned pin mounting openings in the end pivot lug portions 20, the male pivot lugs 15 and the medial pivot lug portion 18. The hinged connection between the adjacent slats is such that adjacent slats can pivot inwardly relative to each other in the manner of the slats illustrated on each end of the loop of slats of FIG. 2; however, adjacent slats cannot pivot outwardly with respect to each other due to the unique hinge construction best illustrated in FIG. 4 and also illustrated in FIG. 6. Consequently, the loop 10 assumes the position illustrated in FIGS. 1 and 2 when supported on a floor or other horizontal surface. More specifically, FIGS. 4 and 6 illustrate the shape of one of the end pivot lug portions 20 the shape of which is identical to that of the medial pivot lug portion 18 and the male pivot lugs 15 with each of the pivot lugs having an outer edge termination comprising a flat lug abutment surface 26 which extends inwardly from the outer face 14 of each slat 12 toward the inner face 13. However, it will be noted that the flat lug abutment surface 26 extends inwardly from outer face 14 less than half the thickness of the slat with the remaining edge portions of the lugs comprising a canted clearance surface 32. The flat lug abutment surface 26 engages the flat surface 14' in the case of lugs 18 and 20 and the surface 16' in the case of male pivot lugs 15. Consequently, the abutment surface 26 serves to prevent pivotal movement of the adjacent slat outwardly with respect to each other as previously discussed.

Pivot pin 22 is retained in place by means of a radially extending lock pin 38 engageable with the under surface of a retaining lug 40 formed on one end of the slats adjacent the opening in which the pivot pin is mounted. A coil compression spring 42 urges the pivot pin 22 outwardly so that the lock pin 38 engages the retaining lug surfaces 40 in an obvious manner. The head 44 of the pin is provided with a slot for receiving a screw driver to permit rotation of the pin 22 to rotate the lock pin 38 away from engagement with the retaining lug 40 so that the pivot pin can be removed from the assembly for replacement or to permit the addition or removal of slats from the loop to effect a change in the size of the loop.

The composite loop formed by the hingedly connected slat members is usable in the manner illustrated in FIG. 1 with the user 11 being positioned on the interior of the loop so that forward or rearward movement of the user results in a crawling type movement of the loop across the supporting surface in an obvious manner. The hinge juncture of the adjacent slats is such that there are practically no open spaces between the adjacent slats which would permit an injury to the user. Movement of the loop across the supporting surface is easily effected by virtue of the fact that the slats are formed of lightweight plastic or the like.

In another method of use, the user stands on the upper surface of the loop and walks in one direction creating movement of the loop across the supporting surface in an opposite direction. The ability of the loop to support the weight of the user is achieved by virtue of the specific hinge construction which prevents relative pivotal movement of the slats outwardly with respect to each other.

Alternatively, the loop illustrated in FIG. 10 can be used with a roller-sled member 46 curved upwardly on each end and formed of plastic or the like and including rollers 48 mounted on a support panel 50 extending the width of the loop as best illustrated in FIG. 7. Support panel 50 is provided with guide flanges 52 adjacent each side overlying the edges of the loop defined by the slat ends for maintaining the roller-sled in position within the loop as illustrated in FIG. 7. In use, the operator sits on the support panel 50 and rides the device down an inclined supporting surface such as a hill or the like. Additionally, it is possible to pull the device by a rope attached to the guide flanges 52 or other elements of the roller-sled.

Attention is now invited to FIGS. 10 and 11 which illustrate another embodiment of the invention in which individual slats 12' essentially identical to the previously discussed slats 12 are hingedly connected in the same manner as the preferred embodiment to form a composite loop comprising first and second side-by-side aligned loop portions 56 and 58 connected by a slide bearing means 60 formed of low-friction plastic material and extending about the entire periphery of the composite loop for permitting relative movement of the first and second loop portions 56 and 58 while retaining the individual loop portions in connection as shown in FIG. 10. The details of the slide bearing 60 60 are best illustrated in FIG. 11 with the bearing in cross-section comprising first and second retainer members 62 and 64 of circular configuration received in a circular opening extending inwardly of the end of the slat members 12 across the width of the slat members 12' to permit relative movement of the slats of one of the loop portions with respect to the slats of the other loop portion. A connector web 66 extends between the retainer members and is of less thickness than the retainer members 62 and 64 so that the retainer members cannot be pulled outwardly through the slot in the slat in which the connector web 66 is mounted. Space for the openings for the retainer members is provided by making the pivot pin 22 slightly shorter on its plain end. A spacer web 68 extends outwardly from the connector web 66 and merges into a cap plate 70 overlying the slot between the two loop portions.

The embodiment of FIGS. 10 and 11 can be used in the same manner as the first embodiment but also has the additional ability of operation by movement of the adjacent loop components in different directions in the manner illustrated by the arrows of FIG. 10 so that the device can be steered in the manner of a tracked vehicle.

Numerous modifications of the preferred embodiment will undoubtedly occur to those of skill in the art. For example, the size of the device can vary over a wide range. Similarly, while the slats 12 and 12' and roller-sled 46 are preferably formed of plastic, other materials such as wood, aluminum, steel, or other metal can also be used; also, slats 12 could be made hollow if desired. Therefore, it should be understood that the spirit and scope of the invention is to be limited solely by the appended claims.

I claim:

1. An amusement device in the nature of a self-complete, user powered vehicle comprising a plurality of parallel slats arranged in spaced edge-to-edge relation in a closed flat loop configuration, said slats having inner faces forming the internal surface of said loop and outer faces forming the outer surface of said loop, and hinge means provided between facing edges of said slats for permitting relative pivotal movement of adjacent slats inwardly with respect to said loop but preventing substantial relative pivotal movement of said slats in a reverse direction outwardly of said loop beyond a position in which said slats are in substantial coplanar orientation, said slats being of sufficient number and size to form a loop of adequate size to permit a user to assume a position of use fully within the confines of said internal surface of said loop or to be supported on the upper external surface of said loop.

2. The invention of claim 1 wherein said hinge means comprises lug members extending outwardly from one edge of each slat and slots extending inwardly from the opposite edge of each slat, each of said lug members extending into an aligned slot on the facing edge of an adjacent slat, and pivot pin means extending through said lug members and adjacent portions of said opposite edge.

3. The invention of claim 2 wherein the outer edge extent of said lug members comprises a lug abutment surface oriented substantially perpendicularly with respect to the inner and outer faces of said slats, and extending inwardly from said outer face toward said inner face a distance less than half the thickness of said slats, a slot abutment surface defining the inner extent of said slots oriented substantially perpendicular with respect to the inner and the outer face surfaces of said slats and against which the lug abutment surface is engaged when adjacent slats are in substantially parallel relation and a canted clearance surface extending from the inner extent of said lug abutment surface diverging away from said slot abutment surface to the inner face of said slat so as to permit pivotal movement of adjacent slats with respect to each other relatively inwardly with respect to said loop so that said loop is capable of supporting the weight of a user standing on the upper surface of said loop when the loop is in a generally oval configuration such as when supported on a flat floor or other similar supporting surface.

4. The invention of claim 3 additionally including an internal roller-sled positioned on and engaging only that portion of the interior of said loop extending between the end portions of said loop along the bottom portion of said loop, roller means mounted on said sled supporting said sled on the inner faces of the slats forming the bottom portion of the loop for permitting said roller-sled to move with respect to said loop as said flattened loop traverses a supporting surface.

5. The invention of claim 4 additionally including guide members on said roller-sled overlying the edges of said loop for preventing transverse movement of said roller-sled with respect to said loop.

6. The invention of claim 5 additionally including release bolt latch means for normally maintaining said pivot pin means in position while permitting removal of said pivot pin means for removal or replacement of said slats to vary the size of said loop.

7. The invention of claim 6 wherein said latch means includes a radially extending lock pin adjacent one end of said pivot pin means, spring means biassing said pivot pin means outwardly in an axial direction from said loop, a retaining lug provided adjacent said lock pin for engaging said lock pin and preventing axial movement of said pivot pin means when said lock pin is aligned with said retaining lug, said pivot pin means being rotatable about its axis to position said lock pin away from said retaining lug to permit the removal of said pivot pin means from said loop.

8. The invention of claim 1 wherein said loop is a composite loop comprising first and second side-by-side aligned loop portions, a slide bearing means provided between and connecting said aligned loop portions for permitting a user on the interior of said loop to exert force in one direction on one of said loop portions and another direction on the other of said loop portions to effect relative movement of said loop portions to provide a steering effect for said composite loop.

9. The invention of claim 8 wherein said slide bearing means comprises a low-friction loop of plastic material positioned between said first and second loop portions and which in cross-section unitarily comprises first and second retainer members received in slots provided in the facing end edges of the slats of said first and second loop portions, respectively, a connector web of less thickness than said retainer members extending between said retainer members, an edge spacer web section extending inwardly from said connector web and an internal cap plate oriented generally perpendicularly to said edge spacer web section and extending transversely over the adjacent inner faces of adjacent slats of both of said loop portions.

10. The invention of claim 8 wherein said hinge means comprises lug members extending outwardly from one edge of each slat and slots extending inwardly from the opposite edge of each slat, each of said lug members extending into an aligned slot on the facing edge of an adjacent slat, and pivot pin means extending through said lug members and adjacent portions of said opposite edge.

11. The invention of claim 10 wherein said slide bearing means comprises a low-friction loop of plastic material positioned between said first and second loop portions and which in cross-section unitarily comprises first and second retainer members received in slots provided in the facing end edges of the slats of said first loop portion, a connector web of less thickness than said retainer members extending between said retainer members, an edge spacer web section extending inwardly from said connector web and an internal cap plate oriented generally perpendicularly to said edge spacer web section and extending transversely over the adjacent inner faces of adjacent slats of both of said loop portions.

12. The invention of claim 10 wherein the outer edge extent of said lug members comprises a lug abutment surface oriented substantially perpendicularly with respect to the inner and outer faces of said slats, and extending inwardly from said outer face toward said inner face a distance less than half the thickness of said slats, a slot abutment surface defining the inner extent of said slots oriented substantially perpendicular with respect to the inner and the outer face surfaces of said slats and against which the lug abutment surface is engaged when adjacent slats are in substantially parallel relation and a canted clearance surface extending from the inner extent of said lug abutment surface diverging away from said slot abutment surface to the inner face of said slat so as to permit pivotal movement of adjacent slats with respect to each other relatively inwardly with respect to said loop so that said loop is capable of supporting the weight of a user standing on the upper surface of said loop when the loop is in a generally oval configuration such as when supported on a flat floor or other similar supporting surface.

13. The invention of claim 12 wherein said slide bearing means comprises a low-friction loop of plastic material positioned between said first and second loop portions and which in cross-section unitarily comprises first and second retainer members received in slots provided in the facing end edges of the slats of said first loop portion, a connector web of less thickness than said retainer members extending between said retainer members, an edge spacer web section extending inwardly from said connector web and an internal cap plate oriented generally perpendicularly to said edge spacer web section and extending transversely over the adjacent inner faces of adjacent slats of both of said loop portions.

14. The invention of claim 12 additionally including release bolt latch means for normally maintaining said pivot pin means in position while permitting removal of said pivot pin means for removal or addition of said slats to vary the size of said loop, said release bolt latch means including a radially extending lock pin adjacent one end of said pivot pin means, spring means biassing said pivot pin means outwardly in an axial direction from said loop, a retaining lug provided adjacent said lock pin for engaging said lock pin and preventing axial movement of said pivot pin means when said lock pin is aligned with said retaining lug, said pivot pin means being rotatable about its axis to position said lock pin away from said retaining lug to permit the removal of said pivot pin means from said loop.

15. A ridable user powered amusement type device comprising a closed relatively flexible free-standing loop means of flattened oval configuration having an upper linear flight and a lower linear flight and an inner face and an outer face, said loop means including means forming a part thereof for independently maintaining said upper linear flight spaced above said lower linear flight by an amount sufficient to permit a user to assume a position of use fully within the confines of said inner surface and a roller-sled including a support panel extending adjacent the lower linear flight for supporting a user of the device on the interior of said loop and rollers mounted on said support panel to roll along said inner face portion of the lower flight to effect movement of said loop along said supporting surface.

16. The invention of claim 15 additionally including retaining means overlapping the sides of said loop means for maintaining said roller-sled within the confines of said loop means.

* * * * *